Oct. 2, 1962 W. C. RAUSKE ET AL 3,056,850
MULTIPLE CELL GALVANIC BATTERY
Filed Oct. 30, 1959 2 Sheets-Sheet 1

INVENTORS
WOLDEMAR C. RAUSKE
JAMES K. PARKEY
BY *John F. Hohmann*
ATTORNEY

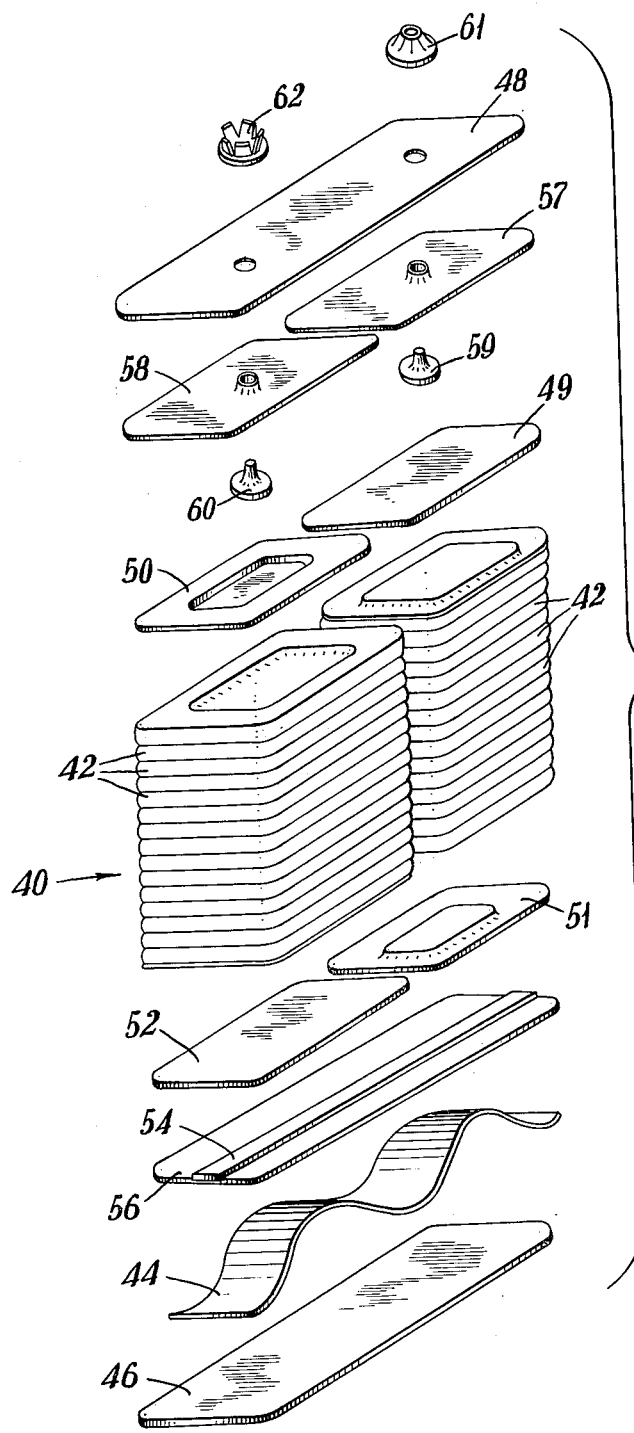

United States Patent Office 3,056,850
Patented Oct. 2, 1962

3,056,850
MULTIPLE CELL GALVANIC BATTERY
Woldemar C. Rauske, North Olmsted, and James K. Parkey, Cleveland, Ohio, assignors to Union Carbide Corporation, a corporation of New York
Filed Oct. 30, 1959, Ser. No. 849,870
5 Claims. (Cl. 136—173)

This invention relates to multiple cell galvanic batteries and it more particularly refers to a container assembly for such batteries.

It has been standard practice in the battery art to manufacture batteries composed of a multiplicity of individual galvanic cells when a particular application calls for a higher voltage or current than is available from any of the standard individual cells. These batteries are generally made by inserting the appropriate number of cells in a suitable container, soldering leads to the appropriate cell electrodes, and suitably covering the container with a member having external terminals appropriately passing therethrough. Thus, a 6 volt lantern battery has been made out of four conventional cylindrical cells, each of which delivers 1.5 volts, connected in series.

This construction has proved adequate for most purposes. It has now become necessary, however, to produce multiple cell batteries, especially for particular military uses, which are capable of withstanding severe vibration and shock at relatively low temperatures. The operating temperature for these new batteries is designated as 0° C. The severe vibration and shock conditions at low temperature are not adequately met by conventional multiple cell batteries primarily because of the fact that they are potted with asphalt which becomes very hard and brittle at about 0° C. Under severe vibration and shock the asphalt tends to break up and the broken pieces thereof tend to damage or sometimes even destroy the soldered joint between the various individual galvanic cells.

It is, therefore, a most important object of this invention to provide a multiple cell galvanic battery which is more shock and vibration resistant at low temperatures than those presently available.

It is another object of this invention to provide such a battery which has no potting material which is subject to brittleness at low temperatures.

It is a further object of this invention to provide such a battery which is not more expensive to manufacture than those presently available.

Fulfilling these objects, this invention includes a container assembly adapted to house a multiple cell galvanic battery comprising a rigid container having a rigid top and bottom attached thereto; at least one spring means in said container bearing against either the bottom or the top; and at least one member composed of at least one conductive strip and a resilient, yieldable insulating pad wherein said strip is an integral part of said pad but is insulated thereby from other parts of the container assembly. The pad further acts to insulate the conductive strips from each other should there be more than one on a single pad.

Understanding of this invention will be facilitated by reference to the acompanying drawing in which:

FIG. 3 is similar to FIG. 2 showing a battery made according to this invention which has a different type of individual galvanic cell therein.

The total battery assembly according to this invention comprises a rigid container having a bottom and a top thereon; a multiplicity of individual galvanic cells suitably arranged in the container; at least one assembly composed of at least one conductive strip and a resilient, yieldable insulating pad, wherein the conductive strip suitably connects at least some of the electrodes of the individual galvanic cells solely by means of mechanical pressure contact; and at least one spring means bearing against either the top or the bottom of the container which serves to force the proper cell electrodes into intimate association with the appropriate conductive strip. The top and the bottom of the container serve to maintain the spring means under compression thereby insuring good physical and electrical contact between the conductive strip and the cell electrodes.

It is to be noted, both from the above-mentioned drawing and from the descriptive matter herein, that this invention is applicable to multiple cell batteries which may utilize individual galvanic cells of any construction. Regardless of the construction of the individual cells used, the inventive features of the container assembly, which result in a multiple cell battery which is resistant to severe shock and vibration at low temperatures, remain substantially the same. It is further to be noted that this container assembly is also adapted to join other electronic components, such as for example capacitors, in a manner similar to that shown and described with regard to batteries of individual galvanic cells.

These inventive features include a substantially rigid container which may be cup-shaped, cylindrical, rectangular or modified rectangular; at least one spring means; and at least one conductive strip in cooperation with a resilient yieldable insulating pad.

Figure 1:
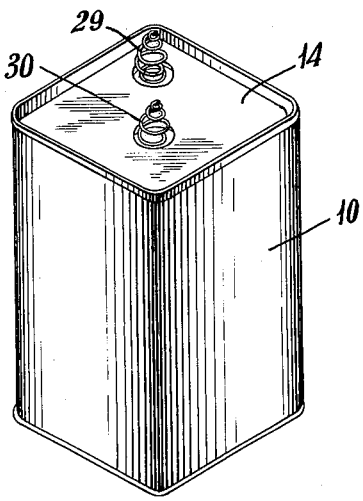
FIG. 1 is an isometric view of a battery made according to this invention.
Figure 2:
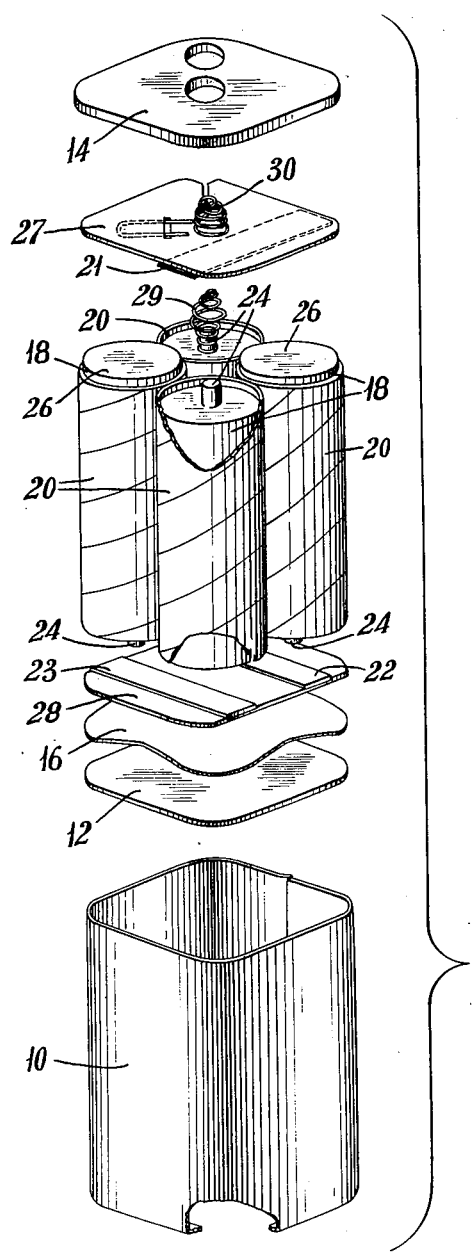
FIG. 2 is an exploded view of the parts of one type of battery made according to this invention.

More particularly, and with reference to FIGS. 1 and 2 of the accompanying drawing, a battery according to this invention comprises a rigid container 10 having a bottom 12 and a top 14; a spring means 16; individual galvanic cells 18; insulation 20 between each of the cells 18 and between the cells and the container 10; three strips 21, 22, and 23 of conductive material electrically connecting the electrodes 24 and 26 of the individual cells 18; and resilient, insulating yieldable pads 27 and 28 respectively supporting the conductive strips 21, 22, and 23. These pads 27 and 28 also serve to electrically isolate the electricity producing components of the battery. It is desirable to provide terminals, such as for example coil spring terminals 29 and 30, which pass through the top 14 thereby allowing external contact to be made to the battery.

FIG. 3 shows a battery made from a number of stacks 40 of flat cells 42 wherein each stack itself is made of a plurality of individual flat cells. When assembled such a battery of flat cells may very closely resemble a battery of cylindrical cells as shown in FIG. 1. Except for the fact that flat cells 42 are illustrated in FIG. 3, the battery construction is very similar to that shown in FIG. 2. The spring means 44 is of a different configuration principally in order to insure pressure on both stacks of cells. It is to be noted in connection with this construction that the individual cells 42 may be connected in series, parallel or series-parallel arrangement in each stack 40 and that the stacks 40 may themselves be connected in series, parallel or series-parallel arrangement. Thus, the individual cells 42 could be connected in series to form a stack 40 having high voltage and relatively low current and then a number of stacks 40 could be connected in parallel to increase the current output at this high voltage.

This assembled battery of cells comprises a bottom 46 and a top 48; spring means 44; stacks 40 of individual galvanic cells 42; end plates 49, 50, 51 and 52 at each end of each cell stack; a strip 54 of conductive material electrically connecting the end plates 51 and 52; a resilient, insulating, yieldable pad 56 supporting the conductive strip 54; insulating pads 57 and 58 between the end plates 49 and 50 and the top 48; contact rivets 59 and 60 extending from the end plates 49 and 50 through the insulating pads 57 and 58 and through the top 48; and contacts 61 and 62 fixed externally adjacent the top 48 to the contact rivets 59 and 60. A rigid container (not shown), similar to that shown in FIG. 2 is used to hold all the battery elements together.

It may be readily seen, and it will be apparent to anyone skilled in the battery art, that any type of flat cell or cylindrical cell is readily adapted to use in this invention. Similarly, it will be obvious that this invention is adapted to use in connection with other electronic components such as capacitors. It is further to be noted that this invention is in no way restricted by the cell system employed whether it be primary or secondary, nor is it retricted to individual galvanic cells of a particular size. The invention lies in the container assembly and in the multiple cell battery as a whole rather than in the construction of the individual cells.

An important feature of this invention is the conductive strip used to contact the appropriate cell electrodes to electrically connect the battery. The conductive strip should be suitably joined, for example by laminating, to an appropriate resilient, yieldable, insulating pad. This assembly should be soft enough to be indented by the cell electrodes so as to insure good contact, but tough enough to resist being cut through by these electrodes or buckling under pressure of the spring means. In some cases, where the spring design is such that total support is not available for this resilient pad, it may be expedient to either replace the resilient pad with a rigid one having a resilient surface or to insert an additional rigid pad between the spring means and the resilient pad. It is desirable, but not essential that the conductive strip material be chosen so as to avoid the possible formation of a bimetallic couple if moisture is present. For this reason it is preferred that the conductive strip material is compatible with the electrode material. It has been found that a good mechanical pressure contact is obtained by using a conductive strip of metal foil such as tin, zinc, aluminum, cadmium, copper, brass, lead, and silver; plastic film loaded with conductive particles such as carbon or metals works very well. Conductive strips 0.001 to 0.005 inch thick have been used and found to be adequate for the purpose here disclosed. It is of course to be understood that the thickness of conductive strip is a function of the electrical resistance of the particular strip material and the amount of current to be carried by the strip. A conventional coating of some corrosion inhibitor, such as petrolatum for example, may be applied over the metal parts of a battery made according to this invention if such is necessitated by the atmospheric conditions in which the battery is to be stored or used.

The insulating pad may be made out of vinyl or polyethylene plastic, or paper board for example. It may be desirable or necessary to provide more than one conductive strip on each pad. It may also be suitable to provide more than one pad per multiple cell battery. Either of these modifications or combinations thereof is well within the purview of this invention and each is intended to be covered herein. It may be necessary to modify the insulating member in the case of a battery made of a number of stacks, each of which contain a multiplicity of individual galvanic cells. While there may be the same number of flat cells in each stack, the total height of any one stack may vary from that of any other stack because of possible variation in the thickness of each flat cell and because each flat cell is itself compressible to a different degree. In these situations it may be expedient to provide the conductive strip and insulating pad as a flexible sheet in order to conform to the height variation in the stacks. Alternatively, it may be well to include more than one insulating pad, each being respectively adjacent one cell stack. Similarly, it is possible to use pads of varying thickness in order to compensate for non-uniformity in the height of the stacks of cells. It should be noted that it is well within the scope of this invention to use circuits printed on a suitably resilient, yieldable, insulating member as the conductive strips with or without the benefit of an additional pad. These devices are well known to the electronic art, however, such have been used for this type of application before.

The spring means referred to above may be a coil or it may be a strip of properly bent spring metal, suitably spring steel. It may be such metal in the shape of a sinusoidal or similar type of curve where the force exerted by the spring is in such direction as to properly connect the battery elements. In the alternative, the spring means may be of rubber or the like. In determining the particular form of the spring means and the particular material from which such is to be made, consideration should be given to the climatic conditions under which the battery is destined to be stored or operated. Particular importance should be given to the temperature and humidity of the atmosphere where the battery is to be used so that the appropriately resistant material may be used. Regardless of the particular type of spring means or the material used to make it, it should conveniently fit the contours of the container and bear both against it and either the top or the bottom thereof. It is well within the scope of this invention to provide more than one spring means in the same battery. Regardless of the number of spring means used however, it is important that a substantially even pressure is exerted against substantially all of the conductive strip and insulating pad. The spring means should preferably be substantially flat in that portion thereof which is in proximity to the strip.

Since all the cells as well as the conductive strips of the multiple cell galvanic battery described herein are properly insulated, it has become expedient to use a metallic container in order to take advantage of the rigidity of these materials. It is most important that the container be rigid in order for the spring means to have something to bear against when it is under compressive loading. While metals are generally best suited to use as the container material because of their outstanding rigidity, it may in some cases be practical to use some of the more rigid non-metals, as for example synthetic resins such as polyester and epoxy laminates. The material used must, however, be at least as shock and vibration resistant as is the rest of the battery.

The container may be constructed as a sleeve with a top and a bottom fitted therein and secured thereto. In the alternative, the container may be deep drawn or molded in such manner, well known to the art, as to form a cup-shaped article to which a top may be conveniently fitted. It must be borne in mind, in either of these constructions however, that the top must force the spring means into compression and must hold it there in order to insure good contact between the conductive strips and the cell electrodes or flat cell stack end plates. One advantage of this type of construction in the case of a battery of flat cells is that the need for tying of the stack of cells is eliminated thus making these cells easier to assemble into a battery.

The following may be cited as specific examples of the practice of this invention:

EXAMPLE I

A 6 volt lantern battery made according to this invention consisted of the following parts:

A rectangular sleeve 4 inches long by 2%6 inches square, modified by having the corners rounded, with a top and a bottom fixed thereto; an arcuate piece of spring steel adjacent the bottom; a sheet of paper board 0.04 inch thick resting on the spring; two substantially parallel strips of zinc foil each ½ inch wide laminated to the face of the paper board opposite to the spring, the board insulating the strips from each other, the container, and the spring; four conventional cylindrical cells, each with a cardboard insulating tube, alternatively spaced so that the positive pole of one cell and the negative pole of an adjacent cell contact the same foil strip; a second paper board sheet 0.04 inch thick with a single strip of zinc foil approximately 0.003 inch thick laminated thereto adjacent the top of the jacket, the strip being substantially perpendicular to the other two strips discussed above and connecting the opposite electrodes of two of the cells to connect all four cells in series; and two coil spring terminals, one from each end of the series battery, extending out through the top.

EXAMPLE II

A 45 volt battery of flat cells made according to this invention consisted of the following parts:

A rectangular sleeve 3³⁹⁄₆₄ inches long by 2²¹⁄₃₂ inches wide by 1 inch deep, modified by having the corners rounded, with a top and a bottom fixed thereto; an arcuate piece of spring steel adjacent the bottom adapted to have two bearing surfaces; a sheet of asphalt impregnated paper board 0.04 inch thick resting on the spring; a strip of zinc foil ½ inch wide laminated to the paper board on the face thereof opposite to the spring, the sheet insulating the strip from the spring and from the container; two stacks of conventional flat cells, each containing 15 individual cells connected in series, in contact with the strip through conventional end plates; two terminals through the top in contact respectively with conventional end plates adjacent the ends respectively of each of the flat cell stacks.

It is to be noted that the battery described herein has eliminated the need for soldered intercell connections. This effectively eliminates a costly assembling step for this type of battery and reduces production cost thereof.

Batteries made according to this invention as well as conventional batteries have been subjected to certain tests in order to determine the superiority of these batteries over those now in common usage. The tests included the standard military vibration test in which a battery was subjected to three mutually perpendicular simple harmonic motions each having an amplitude of 0.03 inch at a given frequency ranging from 10 to 55 cycles per second. According to test specifications, the frequency is started at the lower limit and varies in one cycle per second steps to the maximum and then back to the minimum in between 90 and 100 minutes. In the test, one direction of vibration was always perpendicular to the terminal face, or top, of the battery.

Another test to which these batteries were subjected consisted of subjecting the batteries to a 4 inch free fall ending in an abrupt stop. Each battery underwent 2000 of such "drops" at room temperature and was then cooled to 0° C. whereupon an additional 2000 drops were made during which time the battery temperature was rising from 0° C. to room temperature.

Table I below is a compilation of data taken from the above-described tests on conventional batteries and on batteries made according to this invention.

Table I

| Test | Conventional Batteries | | Invented Batteries | |
|---|---|---|---|---|
| | No. Tested | No. Failed | No. Tested | No. Failed |
| Drop Test | 15 | 7 | 45 | 0 |
| Vibration Test | 15 | 3 | 27 | 0 |

A consideration of the data presented in Table I above shows that the batteries made according to this invention performed perfectly under conditions of severe vibration and shock whereas conventionally made batteries were subject to severe damage under these same conditions.

What is claimed is:

1. In a battery including a rigid container and a multiplicity of individual galvanic cells disposed in said container and having electrodes; the improvement which comprises the combination with said container and cells of spring means seated in said container; an insulating, yieldable, resilient pad between said spring means and said cells; and a flexible electrically conductive strip mounted on said pad on the side thereof adjacent to said cells; said pad insulating said cells from said spring means and said strip making electrical contact between the electrodes of at least two of said cells, said spring means having areas in supporting contact with the side of said pad opposite the points of contact on said strip.

2. A battery as described in claim 1 wherein said electrically conductive strip is composed of metal foil.

3. A battery as described in claim 1 wherein said container is composed of metal and said spring means is composed of spring steel.

4. A battery comprising, in combination, a rigid container having a top open end, a base and side walls; a multiplicity of individual galvanic cells disposed in said container and having electrodes; spring means seated against the base and side walls of said container; an insulating, yieldable, resilient pad between said spring means and said cells; a flexible electrically conductive strip mounted on said pad on the side thereof adjacent to said cells; and a cover fastened to the top open end of said container; said pad insulating said cells from said spring means and said strip making electrical contact between the electrodes of at least two of said cells, said spring means having areas in supporting contact with the side of said pad opposite the points of contact on said strip.

5. A battery as described in claim 4 wherein a second resilient, yieldable, insulating pad is disposed between said cover and said cells and wherein a flexible electrically conductive strip is mounted on said second pad on the side thereof adjacent to said cells making electrical contact between other electrodes of at least two of said cells.

References Cited in the file of this patent

UNITED STATES PATENTS

| | | |
|---|---|---|
| 1,487,429 | Balderston | Mar. 18, 1924 |
| 1,699,446 | Porth | Jan. 15, 1929 |
| 1,858,026 | Schulte et al. | May 10, 1932 |
| 2,536,698 | Ruben | Jan. 2, 1951 |

OTHER REFERENCES

Air Trails Pictorial, pub. by Street & Smith Publications, Inc., N.Y.C., October 1944, p. 76 relied on.

UNITED STATES PATENT OFFICE
CERTIFICATE OF CORRECTION

Patent No. 3,056,850                              October 2, 1962.

Woldemar C. Rauske et al.

It is hereby certified that error appears in the above numbered patent requiring correction and that the said Letters Patent should read as corrected below.

Column 4, line 21, after "have" insert -- never --.

Signed and sealed this 19th day of March 1963.

(SEAL)
Attest:

ESTON G. JOHNSON
Attesting Officer

DAVID L. LADD
Commissioner of Patents